INVENTOR
WILLIAM J. BARTIK

BY J. Donald Weber Jr.
ATTORNEY 3,436,565

NONDESTRUCTIVE READ OUT TUNNEL DIODE MEMORY ELEMENT

William J. Bartik, Jenkintown, Pa., assignor to Sperry Rand Corporation, New York, N.Y., a corporation of Delaware Filed Aug. 16, 1965, Ser. No. 479,858
Int. Cl. H03k *3/26, 19/08, 19/12*
U.S. Cl. 307—322 1 Claim This invention relates to a circuit which operates as a memory element. More particularly, the circuit utilizes tunnel diodes as the memory and read out elements. This circuit is useful in nondestructive read out memories and in associative memories.

There are many uses which may be made of memory devices. For example, in many EDP applications, memory devices are utilized in great quantities. Of course, these memories are required to permit easy and/or rapid access. In addition, many memories include the requirement for nondestructive read out therefrom in order to avoid the necessity for reinserting information thereinto each time the information stored in the memory has been detected or read. Consequently, a non-destructive read out memory element or device such as described hereinafter is desirable. That is, the instant memory element utilizes tunnel diodes which provide extremely rapid switching (on the order of a fractional nanosecond). Also, the instant circuit provides non destructive read out inasmuch as the main memory cell or unit is driven almost imperceptibly whereby the information stored therein is not altered during the read out operation.

Consequently, it is an object of this invention to provide a memory device.

Another object of this invention is to provide a memory element which is capable of nondestructive read out.

Another object of this invention is to provide a tunnel diode memory device.

Another object of this invention is to provide a rapid access memory element which is useful in nondestructive read out memories and in associative memories.

These and other objects and advantages of this invention will become more readily apparent when the following description is read in conjunction with the attached drawings in which.

Figure 1:
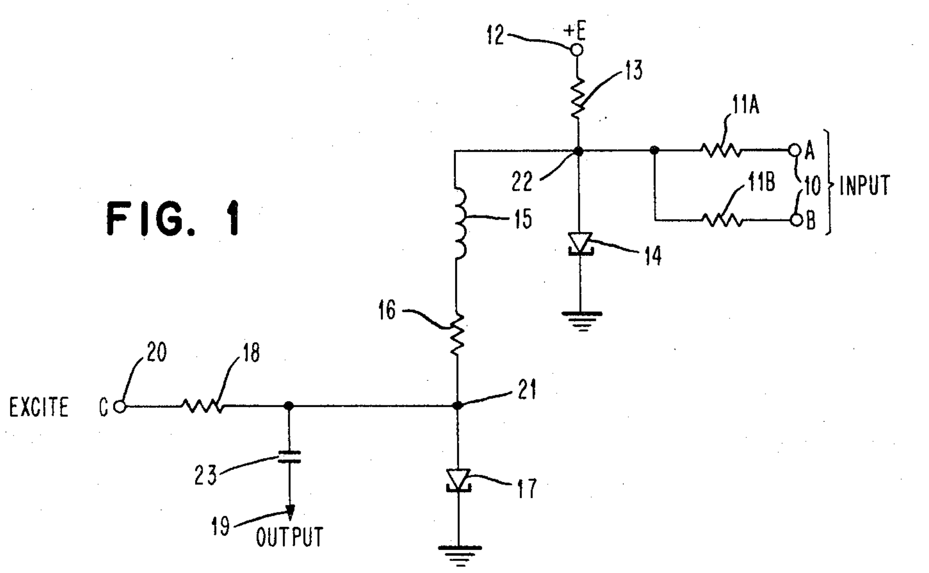
FIGURE 1 is a schematic diagram of one embodiment of this invention.

Referring now to FIG. 1, there is shown a schematic diagram of one embodiment of the instant invention. In this circuit diagram, the input terminals 10 have applied thereto input signals A and B respectively. Input coupling resistors 11*a* and 11*b* are connected to the input terminals 10. The coupling resistors are utilized to provide isolation between stages and to allow for the writing of a high or low voltage state into tunnel diode 14. The coupling resistors are connected to the anode of tunnel diode 14 at common junction 22. The cathode of tunnel diode 14 is connected to a suitable reference potential, for example ground. It should be noted, that tunnel diode 14 should have an extremely high peak current ($I_p$) value relative to tunnel diode 17, for example 50 to 100 milliamperes.

Connected to the common junction 22, and thus to the anode of tunnel diode 14, is the bias source comprising potential source 12 which supplies a substantially constant positive potential +E which is connected via resistor 13. The bias source is so designed to cause tunnel diode 14 to operate in the bistable mode (see FIGURE 2A). Connected to the anode of tunnel diode 14 is the series connection of inductor 15 and resistor 16. This series network is connected to the anode of tunnel diode 17 via common junction 21. The cathode of tunnel diode 17 is returned to a suitable reference potential, for example ground. It should be noted that tunnel diode 17 is a tunnel diode having an extremely low peak current relative to tunnel diode 14, for example 2 milliamperes.

In addition, it will be seen that the potential at the anode of tunnel diode 14 is the potential source which provides the bias characteristic for tunnel diode 17. That is, the potential at common junction 22 (the anode of tunnel diode 14) is supplied via the series network of conductor 15 and resistor 16 to the anode of tunnel diode 17. The bias impedance (inductor 15 and resistor 16) is designed to provide a load at tunnel diode 17 such that the tunnel diode operates in a monostable condition (see FIGURE 2B). Terminal 20 which receives the excite signal C is connected to common junction 21 via resistor 18 which provides a coupling therebetween. Excite signal C is designed to be sufficiently large to switch tunnel diode 17 from the low to the high voltage operating condition or state. Capacitor 23 is connected between the cathode of tunnel diode 17 and the output terminal 19. Capacitor 23 acts to block the D.C. potential at anode 21 so that only changes in the voltage at anode 21 are transmitted to the load which is connected to output terminal 19.

Figure 2B:
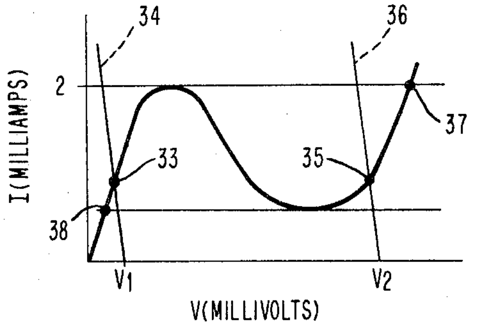
FIGURES 2A and 2B are graphic diagrams of the V–I characteristic curves for the respective tunnel diodes shown in FIGURE 1.
Figure 2A:
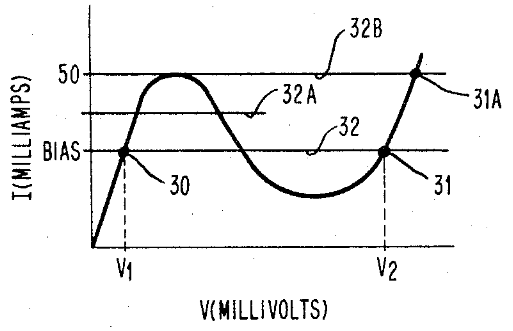

Referring now to FIGURES 2A and 2B concurrently, it is seen that FIGURE 2A relates to tunnel diode 14 and FIGURE 2B relates to tunnel diode 17. Tunnel diode 14 is biased to operate in the bistable mode. The stable operating conditions are shown by the points 30 and 31 on the V–I characteristic thereof. The bias current or load line 32 is shown as an idealized condition. In the operating conditions 30 and 31 the potentials across tunnel diode 14 (and therefore the anode thereof) are $V_1$ and $V_2$ respectively. For example, these potentials may be on the order of +50 and +500 millivolts respectively. It will be seen that the load lines 32A and 32B are indicative of the current levels when input signals are applied. Load line 32A is indicative of a single input signal while load line 32B is indicative of two input signals. A single input signal will not switch tunnel diode 14 but, in this embodiment two input signals will switch tunnel diode 14. Of course, more or less input signals may be required to switch the tunnel diode from operating condition 30 to operating point 31. However, in the illustrative embodiment, only two inputs are shown.

In FIGURE 2B, which relates to the tunnel diode T17, the load lines 34 and 36 are substantially parallel. The potentials which define the load lines are $V_1$ and $V_2$ which represent the potentials at the anode of tunnel diode 14 when operating at operating points 30 and 31 respectively. These load lines are defined to produce monostable operation of tunnel diode 17.

Figure 3:
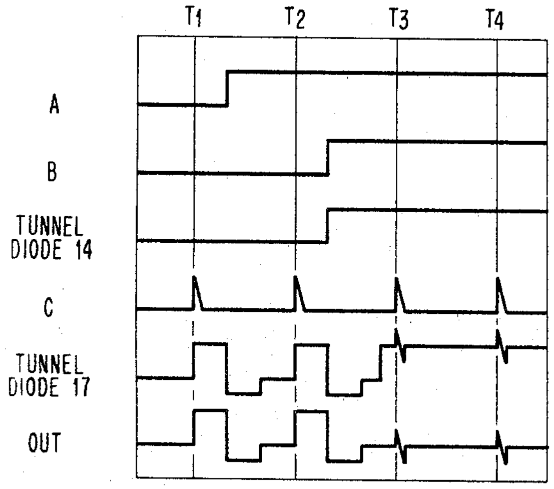
FIGURE 3 is a timing diagram which represents the operation of the circuit embodiment shown in FIGURE 1.

The operation of the circuit shown in FIGURE 1 is more easily understood when the diagrams shown in FIGURES 2A, 2B and 3 are considered concurrently. At time period T1, the input signals A and B are low level signals. Tunnel diode 14 is initially assumed to reside in the low voltage operating region. Since tunnel diode 14 is in the low voltage operating region, tunnel diode 17 also resides in the low voltage operating region. That is, tunnel diode 14 produces an output potential $V_1$ (approximately +50 millivolts) whereby tunnel diode 17 is biased at operating point 33. Therefore, the output signal is a low level signal.

With the application of a positive going excite signal C, tunnel diode 17 is driven from operating point 33 to operating point 37. Because of the change in potential at the anode 21 of tunnel diode 17, energy is stored in inductor 15. This phenomenon is known in the art. Upon the termination of the excite signal, which may be in the nature of a spike signal, the stored energy is discharged by inductor 15. This discharge of energy, which follows the known characteristics as controlled by the RL (resistor 16 and inductor 15) network, tends to maintain and sustain the current flow through tunnel diode 17 whereby an output signal or pulse is produced thereby.

Upon the termination of the discharge of current through winding 15, tunnel diode 17 switches back to operating point 33 from point 37 via points 35 and 38. In other words, the RL series network in the anode of tunnel diode 17 effects a monostable multivibrator or one shot multivibrator load on tunnel diode 17. The output signal or pulse which is produced at the anode of tunnel diode 17 is detected at output terminal 19. In the circuit, as shown, an output signal is indicative of the lack of sufficient input signals to cause tunnel diode 14 to be switched to the "1" state. In other words, an output "1" or high level signal is indicative of a "0" or low level signal stored in the memory cell or device represented by tunnel diode 14. For completeness a small negative going signal is shown at output 19. This small signal is a result of the current flow caused during the discharge of energy by the LR network.

At time period T2, input signal A is switched to the high state. However, input signal B remains low. Thus, referring to FIGURE 2A, it is seen that tunnel diode T14 remains in the low level or low voltage operating condition. Therefore, tunnel diode 17 remains in the low voltage state. Consequently, the application of the excite signal C causes tunnel diode 17 to produce a pulse output.

At time period T3, both of the inputs A and B are high level signals whereby tunnel diode 14 switches to the high voltage state. In the quiescent state, tunnel diode 14 resides at operating point 31 thereby producing a potential $V_2$ at the anode thereof. Under these conditions, tunnel diode 17 (see FIGURE 2B) resides at operating point 35 in the high voltage operating condition. However, blocking capacitor 23 tends to isolate this high voltage D.C. level from output terminal 19.

With the application of the excite signal C, tunnel diode 17 is driven from operating point 35 to operating point 37. This insignificant voltage change causes the storage of little or no energy in inductor 15. Consequently, with the termination of the excite signal, tunnel diode 17 returns to operating point 35. An insignificantly small signal is produced. Inasmuch as the output or voltage change detected across tunnel diode 17 is nominal at best, there is substantially no change in the output signal detected at output terminal 19.

Similarly, at time T4, no output signal is produced inasmuch as tunnel diode 14 resides in the high voltage region as does tunnel diode 17 whereby little or no voltage swing is deteced at the anode of tunnel diode 17.

Figure 4:
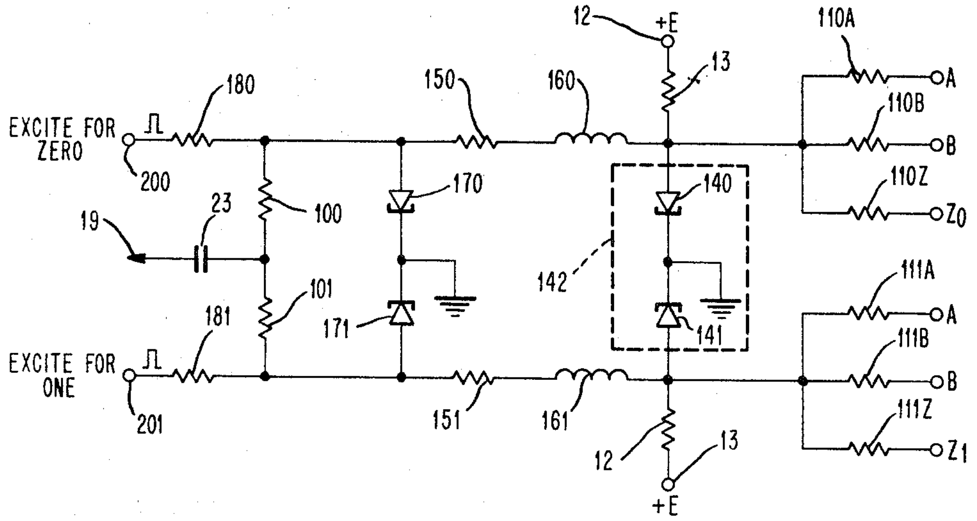
FIGURE 4 is a schematic diagram of another embodiment of the instant invention and implements an associative memory configuration.

FIGURE 4 is a schematic diagram of one embodiment of the invention used as an associative memory. Thus, the input signals A, B and Z are applied to the input terminals and are coupled via resistors 110A, 110B and 110Z to the anode of tunnel diode 140. Similarly, input signals A, B and Z, are applied at input terminals and conducted via resistors 111A, 111B and 111Z respectively to the anode of tunnel diode 141. Tunnel diodes 140 and 141 and, of course, biased for bistable operation by the bias means comprising potential sources 12 and resistors 13. Inductor 150 and resistor 160 form a monostable multivibrator load relative to tunnel diode 170 and inductor 151 and resistor 161 form a similar load relative to tunnel diode 171. The excite or search signals are supplied at terminals 200 and 201. The excite for "0" signal is applied to terminal 200 while the excite for "1" signal supplied to terminal 201. These signals are conducted by resistors 180 and 181 respectively to the anodes of tunnel diodes 170 and 171 respectively. Blocking capacitor 23 is connected between the ouput terminal 19 and the common junction 75 between the isolating resistors 100 and 101.

In this circuit, the principles of an associative memory are utilized. Associative memories are known in the art and detailed description of the generic concept is deemed unnecessary. Thus, the application of an excite for "0" signal at terminal 200 will produce a particular output at terminal 19 in accordance with the particular operation of tunnel diode 170. On the contrary, an excite for "1" signal applied at terminal 201 will cause a signal on output terminal 19 in accordance with the particular operation of tunnel diode 171.

Viewing the circuit shown in FIGURE 4 as an associative memory wherein the tunnel diodes 140 and 141 (shown in the dashed outline 142) represent the memory device or element, inputs are supplied at terminals A, B, $Z_0$ and/or $Z_1$. Terminals A and B are indicative of the row and column connections which may be made in the matrix type memory. The $Z_0$, $Z_1$ terminals are those terminals to which the information is applied in order to store a "1" or "0." With the application of signals at A, B and either $Z_0$ or $Z_1$, tunnel diode 140 or 141 is switched to the high voltage state. Upon the application of a reset signal by any suitable means (not shown) the tunnel diodes will be reset to the low voltage state. Of course, by suitable rearrangement of the elements and utilization of opposite polarity signals, the opposite operation may be achieved.

Typically, a binary "1" may be stored in the memory element by applying an A, B and $Z_1$ signal. That is, the A and B signals are, of course, required in order to select the memory element which is to have information stored therein. This is the standard coincident current technique concept. Also, the $Z_1$ signal is, of course, required in order to switch the tunnel diode 141 to the high voltage operating condition from the low voltage condition. In the alternative, a binary "0" signal may be stored when the $Z_0$ signal is applied to tunnnel diode 140 concurrently with A and B signals.

The memory element is interrogated by means of the excite signals. In particular, the excite for "1" signal is applied to terminal 201. This signal is applied to the anode of the tunnel diode 171 via resistor 181. Initially, it is assumed that a one is stored in the memory element, i.e. tunnel diode 141 is in the high voltage state. Since tunnel diode 171 resides in the high voltage operating condition when tunnel diode 141 resides in the high (i.e. zero) condition. Therefore, the excite for 1 signal switches tunnel diode 171 along the operating characteristic in the high voltage operating condition. As described supra, the change of potential at the anode of tunnel diode 170 is insufficient to produce an output signal. The lack of an output signal indicates a match between the stored information signal and the excitation signal.

Of course, if a one had not been stored in tunnel diode 141, the operating condition of the tunnel diode, as well as tunnel diode 171 would be in the low voltage state. Thus, the excite for one signal at terminal 201 would switch tunnel diode 171 to the high voltage state and thereby cause current flow through the series network comprising resistor 160 and inductor 150. Upon the termination of the excite for "1" spike signal, the energy stored in inductor 151 by the current which previously flowed therethrough tends to discharge in such a fashion to effect a pulse output signal at output terminal 19. That is, tunnel diode 171 is switched to the high voltage operating condition thereby applying a high voltage at terminal 19 via resistor 101. The energy released from inductor 151 tends to maintain tunnel diode 171 in the high voltage operating condition and, therefore, maintain a relatively high potential output at terminal 19. Eventually, the energy stored in inductor 151 is completely discharged whereby the potential across tunnel diode 171 falls below the potential required to maintain tunnel diode 171 in the high voltage operating region. At this time, tunnel diode 171 switches to the low voltage operating region and, ultimately to the initial operating point 33, for example. It is seen that the operation is substantially similar to that discussed supra. The generation of an output pulse is indicative of a mismatch between the information signal stored in the memory and the excitation signal.

In the alternative, if a zero is not initially stored in the memory, tunnel diode 140 is switched to the high voltage state by concurrently applied input signals A, B and $Z_0$. When tunnel diode 140 is high, tunnel diode 170 is similarly high.

An excite for "0" signal may be applied at terminal 200. This signal is similar to the signal applied at terminal 201, and switches tunnel diode 170 along the characteristic thereof in the high voltage state. Consequently, tunnel diode 170 does not switch operating states, but rather has the potential at the anode thereof raised somewhat. Since the potential change at the anode of tunnel diode 170 is not substantial, the current flow and, thus, the energy stored in inductor 160 is nominal. In addition, upon the cessation of the excite for "0" signal, tunnel diode 170 does not switch to the low voltage operating condition but remains in the high voltage operating condition. Thus, the output signal detected at output terminal 19 is insignificant. Thus, the lack of an output signal indicates the match of the excite signal and the information stored in the memory cell.

Of course, if the information stored in the memory cell 142 was reversed such that a "0" was not stored in tunnel diode 140, an excite for "0" signal would produce an output signal at terminal 19 thereby indicating a mismatch of information or excitation signals.

Figure 5:
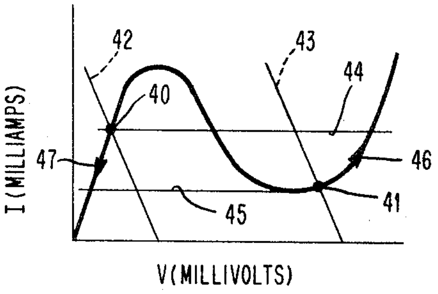
FIGURE 5 is a graphic diagram of the V–I characteristic for the read out tunnel diode in an associative memory having a bi-polar exciting signal.

In an alternative operational concept, the circuit shown in FIGURE 1, or, in effect, one-half of the circuit shown in FIGURE 4, could be made to operate with a bipolar excite signal applied thereto. The operation of the circuit is suggested in accordance with the graphical showing in FIGURE 5. Thus, the output tunnel diode, for example, tunnel diode 17 of FIGURE 1 would be biased for monostable operation having the operating points 40 and 41 determined by the intersection of the characteristic curve with the load lines 42 and 43 respectively. If it is initially assumed that tunnel diode 17 resides at operating point 40, which is indicative of the storage of a "0" in tunnel diode 14, the application of a positive going search or excite for "1" signal would cause tunnel diode 17 to produce a pulse output. On the contrary, a negative going search for "0" signal would merely drive the operating point of tunnel diode 17 along the characteristic curve in the direction shown by the arrow 47. Thus, little or no output would be produced. Consequently, the search for "0" signal would show a "0" was stored in the memory storage element inasmuch as no output signal is produced thereby. A search for "1" signal would indicate the same output information stored in the memory element by producing an output pulse signal which is indicative of a mismatch.

In the alternative, if a "1" were stored in the memory device, tunnel diode 17 would reside at operating point 41. A negative going search for "0" signal would drive the operating point down below the valley voltage point such that a monostable multivibrator action results and a pulse output would be produced by tunnel diode 17. On the contrary, the positive going search for "1" signal would drive the operating point of tunnel diode 17 in the direction shown by arrow 46 thereby producing substantially no output. Again, these signals are properly indicative of the condition of the memory device.

Thus, it is shown that a non-destructive read out memory element is produced. This non-destructive read out element may be utilized as an associative memory. Of course, from the foregoing description, it will be understood that various changes may be made in the form, construction and arrangement of the parts, without departing from the scope of the invention, a form hereinbefore described being merely a preferred embodiment.

The embodiments of the invention in which an exclusive property or privilege is claimed are defined as follows:

1. In combination, first and second tunnel diodes, each having an anode and a cathode, said tunnel diodes having widely differing peak current characteristics with said first tunnel diode having a higher peak current characteristic, bias means connected to the anode of said first tunnel diode to bias said first tunnel diode for bistable operation, input means connected to the anode of said first tunnel diode, excite circuit means connected directly to the anode of said second tunnel diode, inductor means having a single winding and resistor means serially connected to one another and between the anodes of said first and second tunnel diodes, said inductor and resistor means having values such that the R–L time constant thereof is sufficiently long in time duration to maintain and sustain the current flow through said second tunnel diode after the termination of an excite signal, and said inductor and resistor means further having impedance values such that if said first tunnel diode is operating in its high voltage state the voltage at its anode will cause said second tunnel diode to operate in its high voltage state and when said first tunnel diode is operating in its low voltage state the voltage at its anode will cause said second tunnel diode to operate in its low voltage state in the absence of an excite signal, and output signal means directly connected to said excite circuit means and to said anode of said second tunnel diode whereby an excite signal appears as an output signal of relatively short duration when said first tunnel diode is operating in its high voltage state and appears as an output signal of relatively long duration when said first tunnel diode is operating in its low voltage condition.

References Cited

UNITED STATES PATENTS

| | | | |
|---|---|---|---|
| 3,056,048 | 9/1962 | McGrogan | 307—88.5 |
| 3,121,176 | 2/1964 | Burns | 307—88.5 |
| 3,142,769 | 7/1964 | Kaufman | 307—88.5 |
| 3,181,006 | 4/1965 | Melhus | 307—88.5 |
| 3,253,154 | 5/1966 | Kawamoto et al. | 307—88.5 |
| 3,258,611 | 6/1966 | Candilis | 307—88.5 |

OTHER REFERENCES

"Tunnel Diode Digital Circuitry," by W. F. Chow, IRE Transactions on Electronic Computers, 1960, pp. 295–296.

ARTHUR GAUSS, *Primary Examiner.*

H. DIXON, *Assistant Examiner.*